United States Patent
Boarman et al.

(10) Patent No.: US 6,609,112 B1
(45) Date of Patent: Aug. 19, 2003

(54) SYSTEM AND METHOD FOR PROVIDING PROXY-BASED ONLINE DUTCH AUCTION SERVICES

(75) Inventors: Rick Boarman, Mountain View, CA (US); Mike Brors, Fremont, CA (US)

(73) Assignee: DoveBid, Inc., Foster City, CA (US)

( * ) Notice: Subject to any disclaimer, the term of this patent is extended or adjusted under 35 U.S.C. 154(b) by 0 days.

(21) Appl. No.: 09/578,457

(22) Filed: May 22, 2000

Related U.S. Application Data

(60) Provisional application No. 60/135,311, filed on May 20, 1999.

(51) Int. Cl.$^7$ .................................................. C06F 17/60
(52) U.S. Cl. .......................................... 705/37; 705/35
(58) Field of Search ............................................ 705/37

(56) References Cited

U.S. PATENT DOCUMENTS

| | | | | |
|---|---|---|---|---|
| 5,835,896 A | * | 11/1998 | Fisher et al. .................... | 705/37 |
| 6,021,398 A | | 2/2000 | Ausubel ........................ | 705/37 |
| 6,026,383 A | | 2/2000 | Ausubel ........................ | 705/37 |
| 6,285,989 B1 | * | 9/2001 | Shoham ......................... | 705/37 |
| 2002/0082971 A1 | * | 6/2002 | Le et al. ........................ | 705/37 |

FOREIGN PATENT DOCUMENTS

WO    WO 01/53193 A2   *   7/2001

OTHER PUBLICATIONS

ONSALE Brings Thrill of the Auction of the Web, Anonymous, Link–Up v12n4, Jul./Aug. 1995, 2 pages.*
Microsoft Press Computer Dictionary, Third Edition 1997, pp. 294–295 and p. 341.*

* cited by examiner

Primary Examiner—V. Millin
Assistant Examiner—Charles R. Kyle
(74) Attorney, Agent, or Firm—Altheimer & Gray; Michael A Molano; John F. Griffith

(57) ABSTRACT

In a method for providing proxy-based online Dutch auction services, an auction server or manager receives bid messages from a set of auction participants during the course of an auction. Each bid message may include a participant ID, a quantity requested value, a current proxy value indicating a maximum amount that the participant corresponding to the participant ID is willing to pay, and a partial quantity acceptance flag. The auction manager ranks or prioritizes bids in accordance with participants' current proxy values; determines current auction winners and losers and allocates offered items accordingly; determines a new current bid amount; and automatically adjusts participant bid values in accordance with participants the new current bid amount as well as the participants' current proxy values and status as winners or losers. In determining a new current minimum bid amount, the auction manager may selectively adjust an existing bid amount by an increment value depending upon whether a bid has been recorded, and/or whether a recorded bid corresponds to a complete or partial item quantity.

21 Claims, 5 Drawing Sheets

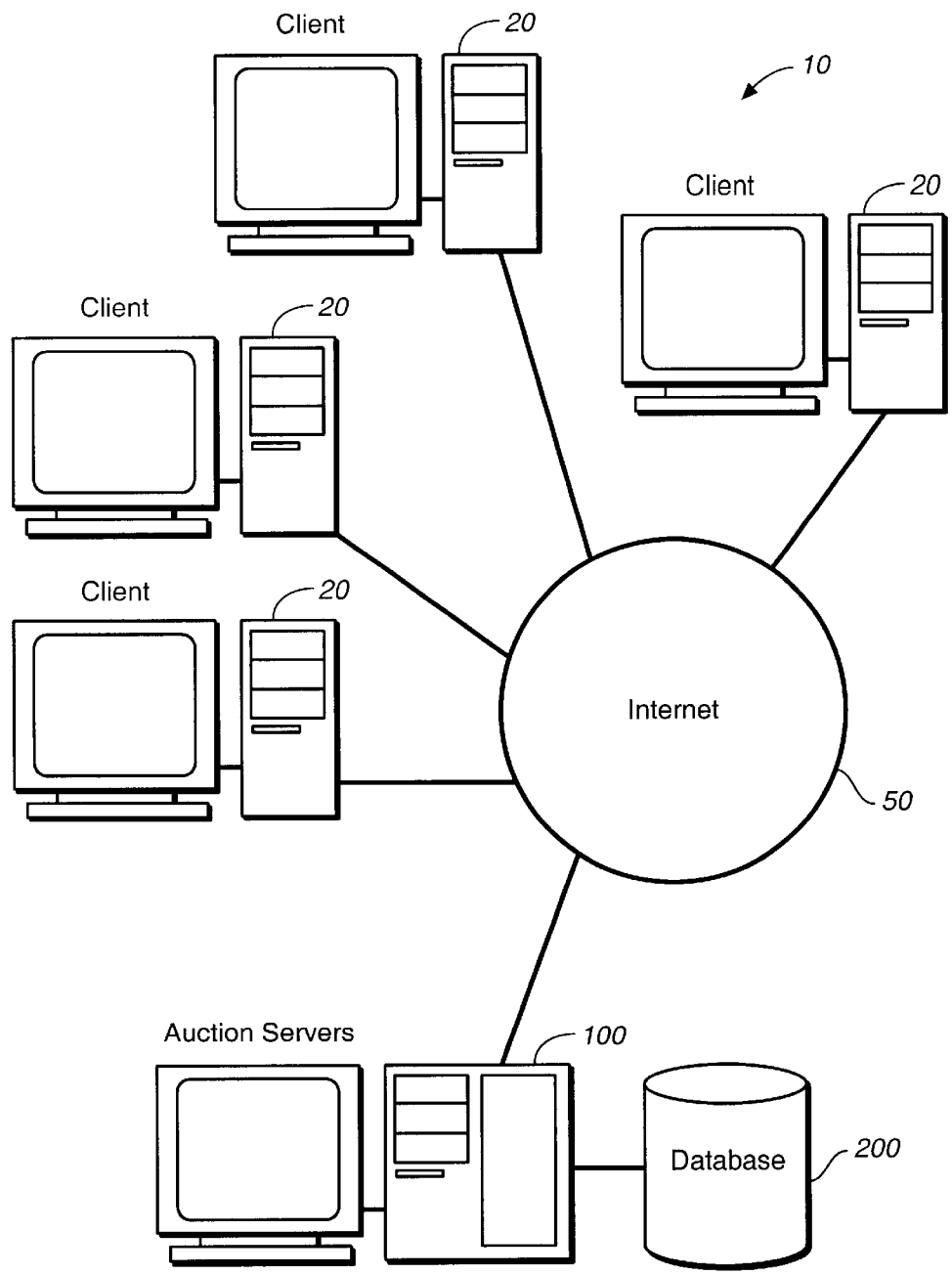
FIG._1

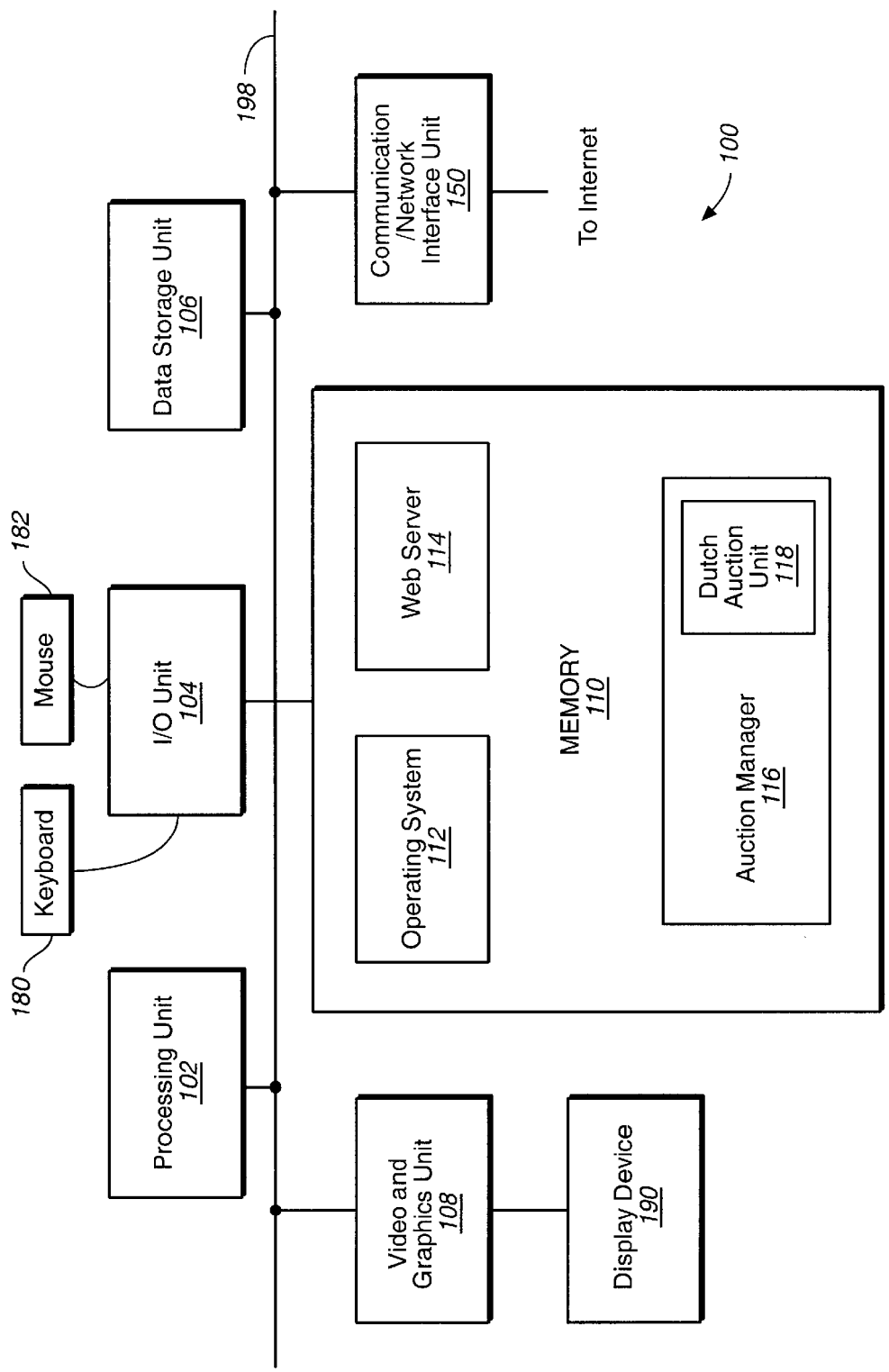
FIG._2

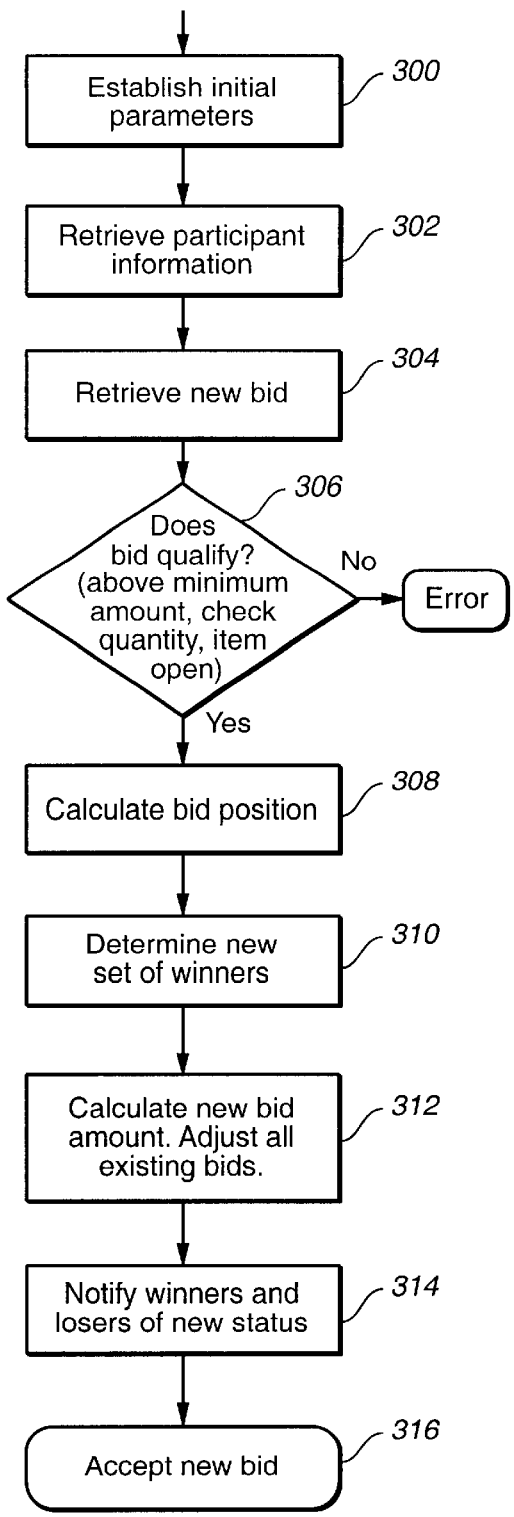
FIG._3A

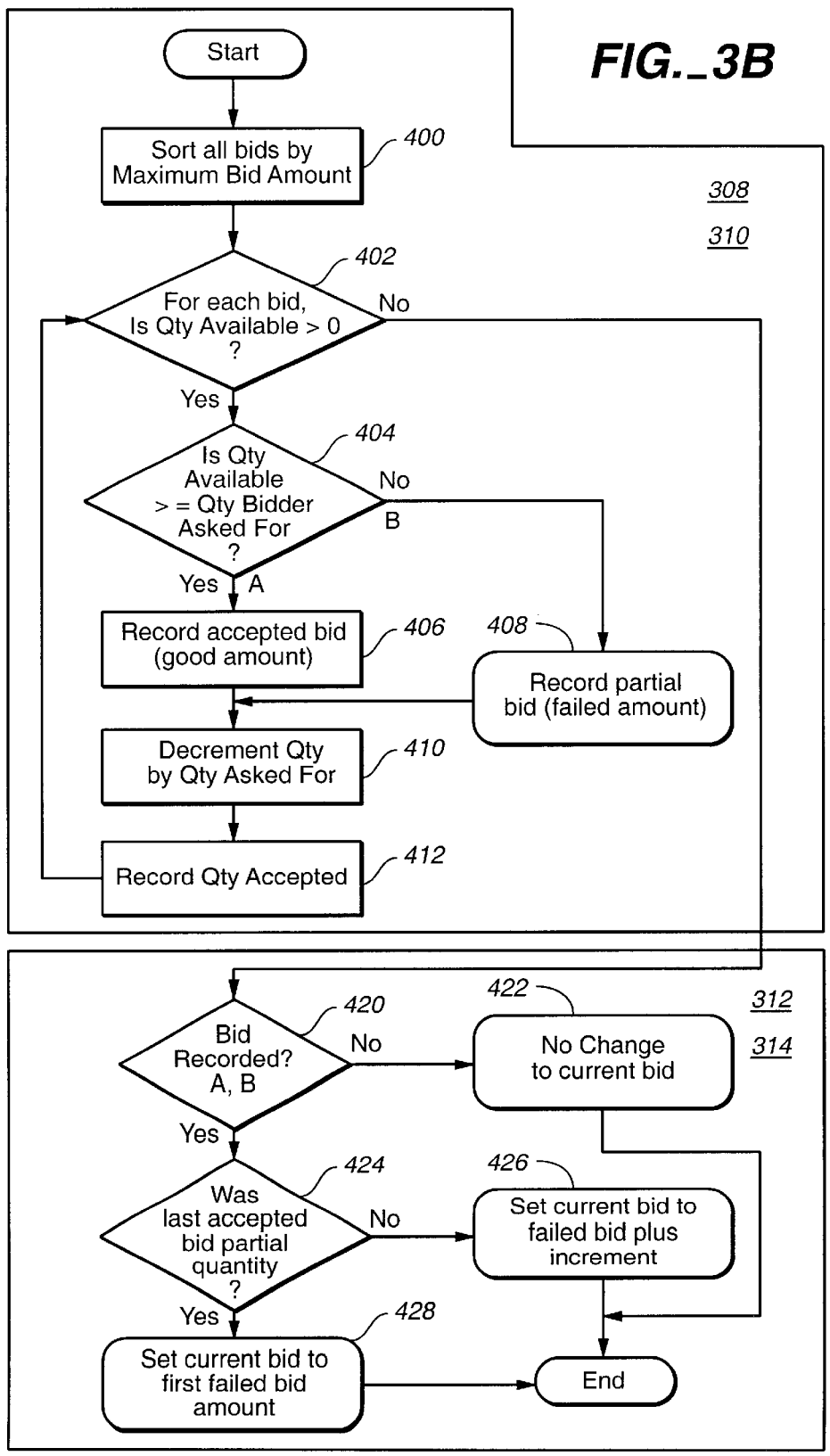
FIG._3B

EXEMPLARY DUTCH AUCTION

| | | Auction Status: | | | |
|---|---|---|---|---|---|
| Initial Minimum Bid | $0.01 | | | | |
| Quantity Available | 10 | Participant Name | Quantity Assigned | Participant's Current Bid | Participant's Current Proxy |
| Bid1 | | | | | |
| Name | Joe | Joe | 3 | $0.01 | $6.00 |
| Quantity Requested | 3 | | | | |
| Specified Proxy Value | $6.00 | | | | |
| Partial OK | Yes | | | | |
| Resulting Current Bid Amount | $0.01 | | | | |
| Bid2 | | | | | |
| Name | Mary | Mary | 2 | $0.01 | $10.00 |
| Quantity Requested | 2 | Joe | 3 | $0.01 | $6.00 |
| Specified Proxy Value | $10.00 | | | | |
| Partial OK | Yes | | | | |
| Resulting Current Bid Amount | $0.01 | | | | |
| Bid3 | | | | | |
| Name | Frank | Mary | 2 | $5.00 | $10.00 |
| Quantity Requested | 10 | Joe | 3 | $5.00 | $6.00 |
| Specified Proxy Value | $5.00 | Frank | 5 | $5.00 | $5.00 |
| Partial OK | Yes | | | | |
| Resulting Current Bid Amount | $5.00 | | | | |
| Bid4 | | | | | |
| Name | Frank | Mary | 2 | $7.00 | $10.00 |
| Quantity Requested | 10 | Frank | 5 | $7.00 | $7.00 |
| Specified Proxy Value | $7.00 | Joe | 0 | N/A | $6.00 |
| Partial OK | Yes | | | | |
| Resulting Current Bid Amount | $7.00 | | | | |
| Bid5 | | | | | |
| Name | Sorsha | Sorsha | 8 | $7.25 | $12.00 |
| Quantity Requested | 8 | Mary | 2 | $7.25 | $10.00 |
| Specified Proxy Value | $12.00 | Frank | 0 | N/A | $7.00 |
| Partial OK | Yes | Joe | 0 | N/A | $6.00 |
| Resulting Current Bid Amount | $7.25 | | | | |

FIG._4

SYSTEM AND METHOD FOR PROVIDING PROXY-BASED ONLINE DUTCH AUCTION SERVICES

REFERENCE TO EARLIER FIELD APPLICATION

This application claims priority to and the benefit of U.S. Provisional Application No. 60/135,311, titled "System and Method for Proxy-Based Online Dutch Auctions," filed May 20, 1999.

BACKGROUND

Online auction services provide, an electronic forum or marketplace through which a set of auction participants may submit bids for one or more items being offered by a sellers. Typically, a participant generates one or more bids via a client computer system that is coupled via the internet to an auction host or server. During the course of an online auction for a single item, the auction host receives and processes bids, and determines which participant is currently the highest bidder, and hence the auction winner, at any given time.

Any given participant may specify a proxy value that indicates a maximum amount that the participant is willing to pay or spend during an online auction. After initiating the auction, the auction host may automatically adjust any given participant's bid in accordance with a minimum bid increment and the participant's proxy value. As a, result, participants need not continually monitor the auction's progress. Rather, a participant may occasionally check the auction's status, and selectively submit one or more updated bids as required, where an updated bid may include an updated proxy value.

A multi-unit or Dutch auction provides a bidding environment in which multiple participants may bid for multiple items. For example, an auction may involve twenty participants bidding for ten items, where each participant desires a single item (in another example, any given participant could desire one or more items). In such a situation, the ten participants who submitted the highest bids will each receive one item at a price given by a lowest common bid amount.

As a more detailed example, a seller may offer or list five hubcaps for sale at $50.00 each. The auction host, possibly in conjunction with parameters specified by the seller, may define a minimum bid increment, which in the context of this example is defined as $1.00. A first bidder, Mary, wants three of the hubcaps, and submits a bid totaling $100.00. A second bidder, Hank, wants the remaining two hubcaps, and submits a bid totaling $110.00. Both Mary and Hank may have the option of accepting fewer items than they desire. Next, a third bidder, John, submits a bid totaling $75.00 for all five items. The auction host may then increase Mary and Hank's bid amounts to $76.00, in which case John will need to submit a bid greater than $76.00 to win the auction. In the event that John submits a bid of $125.00 for all five items, the auction host enters his bid as $111.00, which equals the previous high bid amount (Hank's bid of $110.00) plus the minimum bid increment. If neither Mary nor Hank submit further bids, John will receive all five hubcaps for $111.00.

A significant deficiency of prior online auction services is that they fail to support proxy bidding within the context of Dutch auctions. The present invention overcomes his inadequacy, as described in detail below.

SUMMARY OF THE INVENTION

The present invention comprises a system and method that provides proxy bidding services within the context of online Dutch auctions. In one embodiment, the system comprises a set of client or participant systems that are coupled to an auction server via the internet. A participant system comprises a conventional computer system or workstation capable of communicating over the internet. The auction server may comprise a computer system having a processing unit; an input/output, (I/O) unit; a data storage unit; a video and graphics unit; a memory wherein an operating system, a web server, and an auction manager reside; and a communication unit that facilitates internet-based data exchange.

Each participant system is responsive to input generated by a corresponding user or auction participant, and selectively generates, issues, and/or transfers participant information, offered item information, and/or bids to the auction server in response to such input. The auction server, is coupled to a database that capable of storing information associated with auction participants and items offered for sale.

During an online auction, a participant system may generate one or more bids directed to the auction server. Any given bid may include or specify a participant identification (ID) signal; a quantity requested value that indicates a number of items that the participant desires; a proxy value that indicates a maximum amount that the participant is willing to spend (i.e., the participant's spending cap corresponding to a given auction); and a partial acceptance flag that indicates whether the participant is willing to accept a number of items less than that specified by the quantity requested value.

In one embodiment, a method for providing proxy-based Dutch auction services includes the steps of establishing initial auction parameters and retrieving participant information; receiving a bid; determining whether the bid is valid; determining or calculating a bid position or ranking relative to previously-received bids; and determining, a current set of auction winners and auction losers. The method further includes the steps of generating a current bid amount, and automatically adjusting participants' existing bids relative to their most-recently specified proxy value. Additionally, the method may include the steps of issuing notification messages to participants to inform them of their current status; and accepting and storing a new bid.

Relative to determining bid positions, rankings, and/or priorities, the method in one embodiment includes the steps of sorting bids in accordance with each participant's current proxy value; determining for each bid whether an available item quantity is greater than zero; and determining whether the available item quantity is greater than or equal to the participant's most-recent quantity requested value. If so, the method may record an accepted bid; otherwise, the method may record a partial bid. In either case, the method decrements the available item quantity by the quantity requested, and records a quantity accepted value.

If, for each bid, the available item quantity is not greater than zero, the method determines whether a bid was recorded. If not, the method leaves a current bid unchanged. If a bid has been recorded, the method determines whether a last accepted bid was for a partial quantity, in which case the method sets the current bid to a most-recently failed bid amount. In the event that the last accepted bid does not correspond to a partial quantity, the method sets the current bid to the most-recently failed bid amount plus an increment value.

DESCRIPTION OF THE DRAWINGS

FIG. 1 is a block diagram showing an exemplary computational environment in which the present invention may operate.

FIG. 2 is a block diagram of an auction server 100 constructed in accordance with the present invention.

FIGS. 3A and 3B are a flowchart of a method for providing proxy-based online Dutch auction services.

FIG. 4 is a table showing an exemplary proxy-based Dutch auction bidding sequence and corresponding auction status information.

DETAILED DESCRIPTION

FIG. 1 is a block diagram of an exemplary online auction environment 10 in which the present invention may operate. In the exemplary online auction environment 10, one or more client or participant systems 20 are coupled to at least one auction server 100 via a network 50 such as the internet. Each participant system 20 is responsive to input received from a corresponding user or auction participant. In one embodiment, each auction server 100 is coupled to a database 200. Those skilled in the art will understand that an auction server 100 may store information corresponding to participants in the database 200. Additionally, an auction server 100 may store parameters associated with one or more items being offered for sale in the database 200, where such parameters may include item descriptions and quantities, as further described below One or more auction servers 100 may establish and manage online auctions. During an online auction, participant systems 20 may generate and submit electronic bids on behalf of their corresponding participants. Each such bid, is directed to an item or group of items that an auction server 100 has designated as being for sale. In one embodiment, an auction server 100 may allow any given registered user to function or designate themselves as a seller, and provide or generate parameters and/or descriptive information corresponding to one or more items offered for sale in a manner readily understood by those skilled in the art.

An auction server 100 receives participants' bids for the item or items, and in response determines which participant or participants have submitted the highest bids at any given time. After a predetermined amount of time has elapsed, an auction server 100 disallows further bidding. The auction server 100 subsequently terminates the online auction, and assigns the item or items to the participant or participants that submitted the highest bid or bids, respectively. During online auctions in which multiple items may be divided among multiple participants, the present invention provides proxy-based Dutch auction services, as described in detail below.

Any given participant system 20 may comprise a conventional computer system, such as a personal computer or workstation. As such, a participant system 20 may include a processing unit; an input/output (I/O) unit coupled to a keyboard, a pointing, device such as a mouse and/or other input and/or output devices; a data storage unit; a video and graphics unit coupled to a display device; a communication unit, such as a modem or a network interface card (NIC), that facilitates coupling to the internet; and a memory wherein an operating system an internet browser reside.

FIG. 2 is a block diagram of an auction server 100 constructed in accordance with the present invention. In one embodiment, the auction server 100 comprises a computer system having a processing unit 102; an I/O unit 104 coupled to a keyboard 180 and a mouse or trackball 182; a data storage unit 106; a video and graphics unit 108 coupled to a display device 190; a memory 110 wherein an operating system 112, a web server 114, and an auction manager 116 reside; and a communication unit 150, such as an NIC, that facilitates coupling the auction server 100 the internet. Each element of the auction server 100 is coupled to a common bus 198.

The processing unit 102 comprises a microprocessor capable of executing stored program instructions. The I/O unit 104 may comprise conventional circuitry for controlling I/O devices and performing particular signal conversions upon I/O data. The I/O unit 104 may include, for example, a keyboard controller, a serial port controller, and/or digital signal processing circuitry. The data storage unit 106 may include both fixed and removable media using any one or more of magnetic, optical, magneto-optical, or other available storage technology. The video and graphics unit 108 comprises conventional circuitry for operating upon and outputting data to be displayed, where such circuitry includes a graphics processor, a frame buffer, and display driving circuitry. The communication unit 150 includes conventional hardware and software that facilitates data communication in accordance with conventional protocols.

The memory 110 includes both Random Access Memory (RAM) and Read-Only Memory (ROM), and provides storage for program instructions and data. Within the memory 100, the operating system 112 comprises program instruction sequences that provide services for accessing, communicating with, and/or controlling auction server resources. The operating system 112 provides a software platform upon which application programs may execute, in a manner readily understood by those skilled in the art. Those skilled in the art will also understand that the web server 114 comprises conventional program instruction sequences for responding to requests received via the interned Finally, the auction manager 116 comprises program instruction sequences for establishing and managing online auctions. In one embodiment, the auction manager 116 includes a Dutch auction unit 118 that facilitates or supports proxy bidding during Dutch auctions, in a manner described in detail below.

In one embodiment, once a seller specifies or indicates that multiple items are for sale, the auction manager 116 and/or associated software may generate a graphical object such as a radio button through which the seller can indicate that the auction manager 116 should begin a multi-unit auction. For any given auction, the auction manager 116 may determine or generate a listing fee value based upon an opening price multiplied by a quantity being sold. The auction manager 116 may further determine or generate a commission value based upon a total value of a sale (i.e., quantity times a closing bid value). The present invention may provide support for buyouts, in which the auction manager 116 assigns or allocates a number of items to a given participant in accordance with a quantity requested value and an available item quantity. When a buyout occurs, the auction manager 116 reduces the available item quantity as required. In one embodiment, the auction manager 116 may charge a separate commission for each buyout occurrence or item. The present invention may also support reserve prices. The present invention may additionally generate auction status and/or result notifications, such as one or more e-mail messages, in a manner readily understood by those skilled in the art.

In the context of the present invention, a bid generated by a participant system 20 comprises a message that may include 1) a participant identification (ID) signal that uniquely identifies the participant corresponding to the participant system 20; 2) a quantity requested value that indicates a number of items that the participant desires; 3) a proxy value that indicates a maximum amount that the participant is willing to pay or spend (i.e., the participant's spending cap); and 4) a partial acceptance flag that indicates whether the participant is willing to accept a number of items less than that specified by the quantity requested value. One or more of the aforementioned parameters may be specified prior to or at the outset of a Dutch auction, while other parameters may change as the auction proceeds. In one embodiment, a participant may raise their proxy value or their requested item quantity, but may not lower either one, during the course of a Dutch auction. The present invention automatically increases participants' bids as required, in accordance with and prioritized relative to the participants' proxy values, as the auction progresses.

FIG. 3A is a flowchart of a method for providing proxy-based online Dutch auction services in accordance with the present invention. In one embodiment, the method begins in step 300 with an auction manager 116 establishing initial parameters for a plurality of items to be auctioned, where the initial parameters include an item description, an item count, a minimum bid amount, and a default or initial minimum bid increment value. The auction manager 116 may determine one or more initial parameters via a table lookup operation. Following step 300, the auction manager 116 retrieves or receives and stores an auction participant's proxy value and, a requested number of items in step 302, after which that participant may issue bids for one or more items via their corresponding participant system 20. The auction manager 116 subsequently retrieves or receives a new bid that originated from an auction participant in step 304, and determines whether the new bid is valid in step 306. A valid bid would be above a current minimum bid amount, and for a quantity of items that can be supplied. The auction manager 116 may additionally require that a bid be submitted within a given time interval, such as a predetermined number of days from the start of an auction, in order for the bid to be valid. If the bid is not valid, the auction manager 116 issues an error message to the participant system 20 corresponding to the participant from whom the bid originated. In the event that the auction time limit has been exceeded, the method may end.

In the event that the bid is valid, the auction manager 116 calculates or determines a ranking or positioning for bids currently under consideration in step 308, and determines a current set of auction winners and losers in step 310. The auction manager 116 then selectively calculates a new bid amount, and automatically adjust existing bids in accordance with each participant's corresponding proxy value in step 312. In step 314, the auction manager 116 notifies auction participants of their current status relative to being auction winners or auction losers. Finally, the auction manager 116 accepts a bid in step 316 by storing the bid in the database 200 and issuing a bid acceptance message to the appropriate auction participant. The auction manager, 116 subsequently retrieves or receives another bid via step 304, and performs the aforementioned operations again.

FIG. 3B is a flowchart showing additional method details for providing proxy-based Dutch auction services in accordance with the present invention. Operations shown in FIG. 3B are numerically referenced to operations shown in FIG. 3A. In one embodiment, the auction manager 116 begins by sorting a current set of bids in accordance with participants' current proxy values in step 400. For each participant's bid, the auction manager 116 determines in step 402 whether at least one item is available. If at least one item is available, the auction manger 116 determines whether the quantity of items available is greater than or equal to the quantity that the participant requested in step 404. If so, the auction manager 116 records an accepted bid, decrements a quantity available count value by the number of items the participant requested, and records a quantity accepted value via steps 406, 410, and 412, respectively. In the event that the quantity available is less than the number the participant requested, the auction manager 116 records a partial bid in step 408, and proceeds to step 410.

If in step 402 the quantity available is not greater than zero for each bid, the auction manager 116 determines in step 420 whether a bid was previously recorded via steps 406 or 408 as a complete or partial amount, respectively. If not, the auction manager determines that the current bid amount may remain the same (i.e., no change in the current bid amount is required) in step 422, and the method ends. In the event that the auction manager 116 determines that a bid was recorded in step 420, the auction manager 116 determines whether a last or most-recently accepted bid was for a partial quantity in step 424. If not, the auction manager 116 sets the current bid to the most-recent failed bid amount plus a minimum bid increment value in step 426. The minimum bid increment value may be based upon the default minimum bid increment value, and/or one or more recent bid values received during the course of the auction. If the last accepted bid was for a partial quantity, the auction manager 116 sets the current bid to the most recent failed bid amount in step 428. Steps 426 and 428 are performed in accordance with participants' corresponding proxy values. After either of steps 426 or 428, the method ends.

FIG. 4 is a table showing an exemplary proxy-based Dutch auction bidding sequence and corresponding auction status information. In the exemplary bidding, sequence, ten items are offered for sale, and the auction manager 116 has determined or defined an initial minimum bid amount of $0.01. A first participant, Joe, submits a first bid specifying or indicating a quantity requested, value of three, a current proxy value of $6.0, and a partial acceptance flag that indicates Joe is willing to accept fewer than three items. Upon receiving and processing the first bid, the auction manager 116 allocates three items to Joe, and sets a current bid amount to the minimum bid amount, or $0.01. The auction manager 116 additionally sets or adjusts a first participant bid value corresponding to or associated with Joe to the current bid amount, i.e., $0.01.

A second participant, Mary, submits a second bid indicating a quantity requested value of two, a current proxy value of $10.00, and a partial acceptance flag indicating that Mary is willing to accept fewer than two items. The auction manager 116 ranks or positions Mary's bid above Joe's bid because Mary's current proxy value is greater than Joe's. The auction manager 116 additionally allocates or assigns two items to Mary, and maintains the current bid amount at $0.01. The auction manager 116 further sets or adjusts a second participant bid value associated with Mary to $0.01, the minimum bid amount; and maintains the first participant bid value at $0.01. At this point, a total of five items are currently allocated (two to Mary, and three to Joe), and five remain unallocated.

Next, a third participant, Frank, submits a third bid specifying a quantity requested value of ten (i.e., Frank wants to purchase all available items), a current proxy value of $5.00, and a partial acceptance flag that indicates Frank will accept fewer than ten items. Because Frank's current proxy value is less than that corresponding to either Mary or Joe, the auction manager 116 ranks or positions Frank's bid below the bids previously received from Mary and Joe, and thus assigns Frank only five items (rather than the ten items Frank desires). The auction manager 116 also sets the current bid amount to the most recent valid partial bid, namely, Frank's current proxy value of $5.00. The auction manager 116 additionally sets or adjusts the first and second participant bid values to $5.00, and sets or adjusts a third participant bid value associated with Frank to $5.00.

In the, exemplary bidding sequence, Frank subsequently submits a fourth bid that specifies a new proxy value of $7.00. The auction manager 116 maintains Mary's earlier bid at a highest priority level or ranking because Mary's current proxy value is greater than the other participants' current proxy values. The auction manager 116 ranks Frank's most recent bid (i.e., the fourth bid in this example) below Mary's earlier bid, but above Joe's earlier bid since Frank's current proxy value is below that associated with Mary and above that associated with Joe. As a result of the current bid rankings, and because Mary is requesting two items and Frank is requesting ten, the auction manager 116 allocates two items to Mary arid eight items to Frank. The auction manager 116 allocates zero or no items to Joe, and sets the current bid amount to Frank's current proxy value, namely, $7.00. The auction manager 116 further sets or adjusts the second and third participant bid values (i.e., the participant bid values respectively corresponding to Mary and Frank) to $7.00. The auction manager 116 may additionally assign or associate an invalid or not-applicable flag or indicator to the first participant bid value at this point, since Joe's current proxy value of $6.00 has been exceeded.

A fourth participant, Sorsha, submits a fifth bid indicating or specifying a quantity requested value of eight, a current proxy value of $12.00, and a partial acceptance flag that indicates Sorsha is willing to accept fewer than eight items. Because Sorsha's current proxy value exceeds that associated with either Mary or Frank (i.e., the participants to whom items were allocated prior to Sorsha's bid), the auction manager 116 ranks or positions Sorsha's current bid at a highest level or priority. The auction manager 116 ranks Mary's most-recent bid at a next-lower level, since Mary's current proxy value is the closest to Sorsha's at this point. Given the current bid rankings, the auction manager 116 assigns or allocates eight items to Sorsha, two items to Mary, and zero items to either of Frank or Joe. The auction manager 116 additionally sets the current bid amount to Frank's most-recent bid amount plus a minimum bid increment value. In the exemplary bidding sequence of FIG. 4, the minimum bid increment value is taken to be $0.25 (though it could be another value in an alternate example or embodiment), and thus the current bid amount equals $7.25 at this point. The auction manager 116 further sets or adjusts a fourth participant bid value associated with Sorsha, as well the second participant bid value corresponding to Mary, to $7.25. Finally, the auction manager 116 may assign or associate an invalid or not-applicable flag or indicator to the third participant bid value (i.e., that corresponding to Frank) at this point, since Frank's current proxy value of $7.00 has been exceeded.

In the event that the auction manager 116 receives no additional bids, the auction manager 116 may maintain the current item allocations and terminate or complete the auction after a predetermined amount of time has elapsed. In such a case, Sorsha receives eight items and Mary receives two items, each paying a price of $7.25.

In an exemplary embodiment, an auction server 100 is a workstation having at least one Intel Pentium III or generally-equivalent microprocessor (Intel Corporation, Santa Clara, Calif.); 2048 megabytes of RAM; an internal hard disk drive and a Redundant Array of Inexpensive Disks (RAID) drive; and at least one NIC. Microsoft Windows NT™ (Microsoft Corporation Redmond, W.Va.) may serve as an exemplary operating system 112. In such an embodiment, the web server 114 may be implemented using Microsoft Internet Information Server™, which forms a portion of the operating system in a manner well understood by those skilled in the art. Appendix A provides an exemplary source code listing for implementing proxy-based online Dutch auction services in accordance with the present invention.

While the present invention has been described with reference to particular embodiments, those skilled in the art will recognize that various modifications may be provided. The description herein provides for variations and modifications, and is limited only in the context of the following claims.

What is claimed is:

1. A system for providing proxy-based online Dutch auction services, the system coupled to a set of auction participant systems over a data network, each auction participant system associated with an auction participant, the system comprising:

a processing unit;

a memory wherein an operating system and an auction manager reside, the auction manager receiving and processing bids received over the data network from the auction participant systems, each bid corresponding to one of multiple auction participants, the bids received during the course of a Dutch auction for multiple items, each bid directed to one or more of the multiple items, each bid associated with a proxy value specified by the auction participant corresponding to the bid, the proxy value indicating a maximum amount that the corresponding participant is willing to spend, a quantity requested value associated with each bid, the quantity requested value indicating a number of items desired for purchase by the corresponding participant, the auction manager receiving over the data network from the auction participant systems the proxy values and quantity requested values associated with the bids, the auction manager automatically adjusting a ranking of the bids corresponding to the auction participants in accordance with the associated proxy values specified by the auction participants, the auction manager recording one of the ranked bids as an accepted bid when a quantity of available items value is greater than or equal to the quantity requested value associated with the one bid, and as a partial bid when the quantity of available items value is less than the quantity requested value associated with the one bid, the auction manager setting a current bid amount according to whether the one bid is recorded as the accepted bid or the partial bid.

2. The system of claim 1, the auction manager decrementing, when the one bid is recorded as the accepted bid, the quantity of available items value by the quantity requested value associated with the one bid.

3. The system of claim 1, the auction manager setting, when the one bid is recorded, the current bid amount to a most-recent failed bid amount when a last or most-recently accepted bid is for a partial quantity.

4. The system of claim 1, the auction manager setting, when the one bid is recorded, the current bid amount to a most-recent failed bid amount plus a minimum bid increment value when a last or most-recently accepted bid is not for a partial quantity.

5. The system of claim 1, each bid having an associated partial acceptance flag, the partial acceptance flag indicating whether the corresponding auction participant is willing to accept a number of items less than the quantity requested value associated with the bid.

6. The system of claim 1, the auction manager adjusting the ranking of the bids after each bid is received and processed.

7. The system of claim 1, the auction manager providing a plurality of initial parameters for the multiple items.

8. The system of claim 7, the initial parameters including an item description.

9. The system of claim 7, the initial parameters including an item count.

10. The system of claim 7, the initial parameters including an initial minimum bid amount.

11. The system of claim 7, the initial parameters including a minimum bid increment value.

12. The system of claim 1, the auction manager allocating the multiple items among the auction participants according to the ranking of the bids.

13. A system for providing proxy-based online Dutch auction services, the system coupled to a plurality of auction participant systems over a data network, each auction participant system associated with one of a plurality of auction participants, the system comprising:
 a processing unit;
 a memory wherein an operating system and an auction manager reside, the auction participant systems sending bids to the auction manager over the data network during the course of a Dutch auction for multiple items, each bid directed to one or more of the multiple items, the auction manager receiving and processing the bids, the auction manager retrieving for each auction participant system:
  (i) a quantity requested value specified by the associated auction participant, the quantity requested value indicating a number of items desired for purchase by the associated participant, and
  (ii) a proxy value specified by the associated auction participant, the proxy value indicating a maximum amount that the associated participant is willing to spend,
   the auction manager determining a ranking of the bids according to the proxy values specified by the associated participants, the auction manager recording one of the ranked bids as an accepted bid when a quantity of available items value is greater than or equal to the quantity requested value associated with the one bid, and as a partial bid when the quantity of available items value is less than the quantity requested value associated with the one bid, the auction manager setting a current bid amount according to whether the one bid is recorded as the accepted bid or the partial bid.

14. The system of claim 13, the auction manager determining the ranking of the bids after each bid is received and processed.

15. The system of claim 13, the auction manager sending a message to the auction participant systems, after determining the ranking of the bids, the message indicating the ranking of the bids.

16. The system of claim 13, the auction manager allocating the multiple items among the auction participants according to the ranking of the bids.

17. A system for providing proxy-based online Dutch auction services, the system coupled to a plurality of auction participant systems over a data network, each auction participant system associated with one of a plurality of auction participants, the system comprising:
 a processing unit;
 a memory wherein an operating system and an auction manager reside, the auction manager receiving and processing bids received over the data network from the auction participant systems during the course of a Dutch auction for multiple items, each bid associated with one of a plurality of auction participants, each bid directed to one or more of the multiple items, each bid including:
  (i) a quantity requested value indicating a number of items desired for purchase by the associated participant, and
  (ii) a proxy value indicating a maximum amount that the associated participant is willing to spend,
   the auction manager determining a ranking of the bids according to the proxy values specified by the associated participants, the auction manager recording one of the ranked bids as an accepted bid when a quantity of available items value is greater than or equal to the quantity requested value associated with the one bid, and as a partial bid when the quantity of available items value is less than the quantity requested value associated with the one bid, the auction manager setting a current bid amount according to whether the one bid is recorded as the accepted bid or the partial bid.

18. The system of claim 17, the auction manager setting, when the one bid is recorded, the current bid amount to a most-recent failed bid amount when a last or most-recently accepted bid is for a partial quantity.

19. The system of claim 17, the auction manager setting, when the one bid is recorded, the current bid amount to a most-recent failed bid amount plus a minimum bid increment value when a last or most-recently accepted bid is not for a partial quantity.

20. A system for providing proxy-based online Dutch auction services, the system coupled to a plurality of auction participant systems over a data network, each auction participant system associated with one of a plurality of auction participants, the system comprising:
 a processing unit;
 a memory wherein an operating system and an auction manager reside, the auction manager receiving and processing bids received over the data network from the auction participant systems during the course of a Dutch auction for multiple items, each bid associated with one of a plurality of auction participants, each bid directed to one or more of the multiple items, each bid including:
  (i) a quantity requested value indicating a number of items desired for purchase by the associated participant,
  (ii) a proxy value indicating a maximum amount that the associated participant is willing to spend, and
  (iii) a partial acceptance flag indicating whether the associated participant is wiling to accept a number of items less than the quantity requested value,
the auction manager determining a ranking of the bids according to the proxy values specified by the associated participants, the auction manager recording one of the ranked bids as an accepted bid when a quantity of available items value is greater than or equal to the quantity requested value associated with the one bid, and as a partial bid when the quantity of available items value is less than the quantity requested value associated with the one bid, the auction manager setting a current bid amount according to whether the one bid is recorded as the accepted bid or the partial bid, the auction manager allocating the multiple items among the auction participants according to the ranking of the bids.

21. The system of claim 20, the auction manager sending a message to the auction participant systems, after determining the ranking of the bids, the message indicating the ranking of the bids.

* * * * *